(12) United States Patent
Pandurangarao

(10) Patent No.: US 11,295,218 B2
(45) Date of Patent: Apr. 5, 2022

(54) PARTITIONING SENSOR BASED DATA TO GENERATE DRIVING PATTERN MAP

(71) Applicant: Allstate Solutions Private Limited, Bangalore (IN)

(72) Inventor: Anil Kumar Pandurangarao, Karnataka (IN)

(73) Assignee: ALLSTATE SOLUTIONS PRIVATE LIMITED, Bangalore (IN)

( * ) Notice: Subject to any disclaimer, the term of this patent is extended or adjusted under 35 U.S.C. 154(b) by 1305 days.

(21) Appl. No.: 15/295,317

(22) Filed: Oct. 17, 2016

(65) Prior Publication Data

US 2018/0107932 A1 Apr. 19, 2018

(51) Int. Cl.
 *G06N 5/04* (2006.01)
 *B60W 40/09* (2012.01)
 *G06N 7/00* (2006.01)

(52) U.S. Cl.
 CPC .............. *G06N 5/04* (2013.01); *B60W 40/09* (2013.01); *G06N 7/00* (2013.01)

(58) Field of Classification Search
 CPC .................................. B06W 40/09; G07N 7/00
 See application file for complete search history.

(56) References Cited

U.S. PATENT DOCUMENTS

| | | |
|---|---|---|
| 5,467,388 A | 11/1995 | Redd, Jr. et al. |
| 5,499,182 A | 3/1996 | Ousborne |
| 5,619,568 A | 4/1997 | Miller |
| 6,175,803 B1 | 1/2001 | Chowanic et al. |
| 6,233,445 B1 | 5/2001 | Boltz et al. |
| 6,351,698 B1 | 2/2002 | Kubota et al. |
| 6,629,029 B1 | 9/2003 | Giles |
| 6,868,386 B1 | 3/2005 | Henderson et al. |
| 7,167,787 B2 | 1/2007 | Bastian et al. |
| 7,292,152 B2 | 11/2007 | Torkkola et al. |
| 7,356,516 B2 | 4/2008 | Richey et al. |
| 7,535,344 B2 | 5/2009 | Obradovich |
| 7,565,230 B2 | 7/2009 | Gardner et al. |
| 7,657,441 B2 | 2/2010 | Richey et al. |
| 7,659,827 B2 | 2/2010 | Gunderson et al. |
| 7,742,792 B2 | 6/2010 | Matsui |
| 8,090,598 B2 | 1/2012 | Bauer et al. |
| 8,180,655 B1 | 5/2012 | Hopkins, III |

(Continued)

FOREIGN PATENT DOCUMENTS

| | | |
|---|---|---|
| EP | 0700009 A2 | 3/1996 |
| EP | 2937844 A1 | 10/2015 |

(Continued)

OTHER PUBLICATIONS

SUN, et al., "Context-aware smart car: from model to prototype", Journal of Zhejiang University-SCIENCE A 10, 1049-1059(2009) (Year: 2009).*

(Continued)

*Primary Examiner* — Tsu-Chang Lee
(74) *Attorney, Agent, or Firm* — Dinsmore & Shohl LLP

(57) ABSTRACT

Telematics and external data relating to the real-time driving of a population of drivers vehicle may be collected and used to calculate a driving pattern map. The driving pattern map is used to determine a driving quotient for individual drivers wherein the driving quotient is a relative score. The driving quotient may be displayed to the driver.

16 Claims, 5 Drawing Sheets

(56) References Cited

U.S. PATENT DOCUMENTS

| | | |
|---|---|---|
| 8,270,933 B2 | 9/2012 | Riemer et al. |
| 8,275,348 B2 | 9/2012 | Yen et al. |
| 8,311,858 B2 | 11/2012 | Everett et al. |
| 8,314,708 B2 | 11/2012 | Gunderson et al. |
| 8,332,242 B1 | 12/2012 | Medina, III |
| 8,355,818 B2 | 1/2013 | Nielsen et al. |
| 8,489,433 B2 | 7/2013 | Altieri et al. |
| 8,506,512 B2 | 8/2013 | Aklog et al. |
| 8,508,353 B2 | 8/2013 | Cook et al. |
| 8,538,687 B2 | 9/2013 | Plocher et al. |
| 8,566,126 B1 | 10/2013 | Hopkins, III |
| 8,606,512 B1 | 12/2013 | Bogovich et al. |
| 8,612,139 B2 | 12/2013 | Wang et al. |
| 8,620,575 B2 | 12/2013 | Vogt et al. |
| 8,626,444 B2 | 1/2014 | Li et al. |
| 8,655,965 B2 | 2/2014 | McWithey et al. |
| 8,682,699 B2 | 3/2014 | Collins et al. |
| 8,686,872 B2 | 4/2014 | Szczerba et al. |
| 8,712,429 B2 | 4/2014 | Nagorniak |
| 8,731,768 B2 | 5/2014 | Fernandes et al. |
| 8,744,492 B2 | 6/2014 | Kuo |
| 8,805,707 B2 | 8/2014 | Schumann, Jr. et al. |
| 8,810,425 B2 | 8/2014 | Hyde et al. |
| 8,824,997 B2 | 9/2014 | Gehlen et al. |
| 8,860,564 B2 | 10/2014 | Rubin et al. |
| 8,930,229 B2 | 1/2015 | Bowne et al. |
| 8,971,927 B2 | 3/2015 | Zhou et al. |
| 8,996,234 B1 | 3/2015 | Tamari et al. |
| 9,020,749 B2 | 4/2015 | Aso et al. |
| 9,020,751 B1 | 4/2015 | Bogovich et al. |
| 9,066,210 B2 | 6/2015 | Kalita et al. |
| 9,082,072 B1 | 7/2015 | Wedding, Jr. et al. |
| 9,104,535 B1 | 8/2015 | Brinkmann et al. |
| 9,112,937 B1 | 8/2015 | Warden et al. |
| 9,142,142 B2 | 9/2015 | Nath et al. |
| 9,150,154 B2 | 10/2015 | Miller et al. |
| 9,177,427 B1 | 11/2015 | Briggs et al. |
| 9,207,675 B1 | 12/2015 | Walser et al. |
| 9,317,980 B2 | 4/2016 | Cook et al. |
| 9,519,670 B2 | 12/2016 | Stanek et al. |
| 9,574,888 B1 | 2/2017 | Hu et al. |
| 9,805,601 B1* | 10/2017 | Fields ............... G08G 1/096791 |
| 9,851,214 B1 | 12/2017 | Chintakindi |
| 10,019,904 B1 | 7/2018 | Chan |
| 2002/0046064 A1 | 4/2002 | Maury et al. |
| 2002/0059084 A1 | 5/2002 | Wahlbin et al. |
| 2004/0210353 A1 | 10/2004 | Rice |
| 2004/0214615 A1 | 10/2004 | Entenmann et al. |
| 2005/0060069 A1 | 3/2005 | Breed et al. |
| 2005/0086227 A1 | 4/2005 | Sullivan et al. |
| 2006/0053038 A1 | 3/2006 | Warren et al. |
| 2006/0200008 A1 | 9/2006 | Moore-Ede |
| 2006/0247852 A1 | 11/2006 | Kortge et al. |
| 2006/0253307 A1 | 11/2006 | Warren et al. |
| 2007/0027726 A1 | 2/2007 | Warren et al. |
| 2007/0080816 A1* | 4/2007 | Haque ................. A61B 5/7239 340/576 |
| 2007/0136107 A1 | 6/2007 | Maguire et al. |
| 2007/0226014 A1 | 9/2007 | Alemayehu et al. |
| 2007/0268158 A1 | 11/2007 | Gunderson et al. |
| 2008/0016145 A1 | 1/2008 | Takase et al. |
| 2008/0059351 A1 | 3/2008 | Richey et al. |
| 2008/0065427 A1 | 3/2008 | Helitzer et al. |
| 2008/0120175 A1 | 5/2008 | Doering |
| 2008/0243321 A1 | 10/2008 | Walser et al. |
| 2008/0243558 A1 | 10/2008 | Gupte |
| 2008/0255722 A1 | 10/2008 | McClellan et al. |
| 2008/0255888 A1 | 10/2008 | Berkobin et al. |
| 2008/0262670 A1 | 10/2008 | McClellan et al. |
| 2008/0270519 A1 | 10/2008 | Ekdahl et al. |
| 2008/0294060 A1* | 11/2008 | Haro ................. A61B 5/6846 600/538 |
| 2008/0319602 A1 | 12/2008 | McClellan et al. |
| 2009/0024273 A1 | 1/2009 | Follmer et al. |
| 2009/0024419 A1 | 1/2009 | McClellan et al. |
| 2009/0079555 A1 | 3/2009 | Aguirre De Carcer et al. |
| 2009/0132294 A1 | 5/2009 | Haines |
| 2010/0030582 A1 | 2/2010 | Rippel et al. |
| 2010/0030592 A1 | 2/2010 | Evans et al. |
| 2010/0042314 A1 | 2/2010 | Vogt et al. |
| 2010/0057358 A1 | 3/2010 | Winer et al. |
| 2010/0063850 A1 | 3/2010 | Daniel |
| 2010/0087984 A1 | 4/2010 | Joseph |
| 2010/0131303 A1 | 5/2010 | Collopy et al. |
| 2010/0131304 A1 | 5/2010 | Collopy et al. |
| 2010/0157061 A1 | 6/2010 | Katsman et al. |
| 2010/0174566 A1 | 7/2010 | Helitzer et al. |
| 2010/0205012 A1 | 8/2010 | McClellan |
| 2010/0211259 A1 | 8/2010 | McClellan |
| 2010/0238009 A1 | 9/2010 | Cook et al. |
| 2010/0250021 A1 | 9/2010 | Cook et al. |
| 2010/0292886 A1 | 11/2010 | Szczerba et al. |
| 2010/0323673 A1 | 12/2010 | Etram et al. |
| 2011/0009107 A1 | 1/2011 | Guba et al. |
| 2011/0039581 A1 | 2/2011 | Cai et al. |
| 2011/0054716 A1 | 3/2011 | Stahlin et al. |
| 2011/0090221 A1 | 4/2011 | Ren |
| 2011/0092159 A1 | 4/2011 | Park et al. |
| 2011/0106370 A1 | 5/2011 | Duddle et al. |
| 2011/0144909 A1 | 6/2011 | Ren et al. |
| 2011/0161116 A1 | 6/2011 | Peak et al. |
| 2011/0196571 A1 | 8/2011 | Foladare et al. |
| 2011/0205043 A1 | 8/2011 | Fujiki et al. |
| 2011/0213628 A1 | 9/2011 | Peak et al. |
| 2011/0219080 A1 | 9/2011 | McWithey et al. |
| 2011/0269441 A1 | 11/2011 | Silver |
| 2011/0320492 A1 | 12/2011 | Inghelbrecht |
| 2012/0004933 A1 | 1/2012 | Foladare et al. |
| 2012/0010906 A1 | 1/2012 | Foladare et al. |
| 2012/0021386 A1 | 1/2012 | Anderson et al. |
| 2012/0072243 A1 | 3/2012 | Collins et al. |
| 2012/0072244 A1 | 3/2012 | Collins et al. |
| 2012/0083287 A1 | 4/2012 | Casto et al. |
| 2012/0089423 A1 | 4/2012 | Tamir et al. |
| 2012/0095646 A1* | 4/2012 | Ghazarian ............... G01S 19/17 701/36 |
| 2012/0101855 A1 | 4/2012 | Collins et al. |
| 2012/0109692 A1 | 5/2012 | Collins et al. |
| 2012/0123806 A1 | 5/2012 | Schumann, Jr. et al. |
| 2012/0166229 A1 | 6/2012 | Collins et al. |
| 2012/0197669 A1 | 8/2012 | Kote et al. |
| 2012/0209632 A1 | 8/2012 | Kaminski et al. |
| 2012/0226421 A1 | 9/2012 | Kote et al. |
| 2012/0246192 A1 | 9/2012 | Kenyon |
| 2012/0253586 A1 | 10/2012 | Sakakibara |
| 2012/0289214 A1 | 11/2012 | Hynes et al. |
| 2012/0303392 A1 | 11/2012 | Depura et al. |
| 2012/0311416 A1 | 12/2012 | Richter et al. |
| 2012/0316933 A1 | 12/2012 | Pentland et al. |
| 2013/0006674 A1 | 1/2013 | Bowne et al. |
| 2013/0006675 A1 | 1/2013 | Bowne et al. |
| 2013/0006715 A1 | 1/2013 | Warkentin et al. |
| 2013/0024060 A1 | 1/2013 | Sukkarie et al. |
| 2013/0046559 A1 | 2/2013 | Coleman et al. |
| 2013/0073321 A1 | 3/2013 | Hofmann et al. |
| 2013/0078963 A1 | 3/2013 | Prasad et al. |
| 2013/0090803 A1 | 4/2013 | Stahlin et al. |
| 2013/0110310 A1* | 5/2013 | Young .................. B60W 40/09 701/1 |
| 2013/0124082 A1 | 5/2013 | Cho |
| 2013/0137404 A1 | 5/2013 | Kuo |
| 2013/0151288 A1 | 6/2013 | Bowne et al. |
| 2013/0157640 A1 | 6/2013 | Aycock |
| 2013/0166325 A1 | 6/2013 | Ganapathy et al. |
| 2013/0217331 A1 | 8/2013 | Manente |
| 2013/0238233 A1 | 9/2013 | Kim et al. |
| 2013/0297097 A1 | 11/2013 | Fischer et al. |
| 2013/0304514 A1 | 11/2013 | Hyde et al. |
| 2013/0317736 A1 | 11/2013 | Fernandes et al. |
| 2013/0344856 A1 | 12/2013 | Silver et al. |
| 2014/0019170 A1 | 1/2014 | Coleman et al. |
| 2014/0067434 A1 | 3/2014 | Bourne et al. |
| 2014/0074402 A1 | 3/2014 | Hassib et al. |
| 2014/0080100 A1 | 3/2014 | Phelan et al. |

(56) References Cited

U.S. PATENT DOCUMENTS

| | | | |
|---|---|---|---|
| 2014/0167946 | A1 | 6/2014 | Armitage et al. |
| 2014/0180723 | A1 | 6/2014 | Cote et al. |
| 2014/0207497 | A1 | 7/2014 | Collins et al. |
| 2014/0222280 | A1 | 8/2014 | Salomonsson et al. |
| 2014/0226010 | A1 | 8/2014 | Molin et al. |
| 2014/0257869 | A1 | 9/2014 | Binion et al. |
| 2014/0257871 | A1 | 9/2014 | Christensen et al. |
| 2014/0267263 | A1 | 9/2014 | Beckwith et al. |
| 2014/0267627 | A1 | 9/2014 | Freeman et al. |
| 2014/0268353 | A1 | 9/2014 | Fujimura et al. |
| 2014/0277939 | A1 | 9/2014 | Ren et al. |
| 2014/0278574 | A1 | 9/2014 | Barber |
| 2014/0322676 | A1 | 10/2014 | Raman |
| 2014/0336866 | A1 | 11/2014 | Kloeden et al. |
| 2014/0350970 | A1 | 11/2014 | Schumann, Jr. et al. |
| 2014/0358840 | A1 | 12/2014 | Tadic et al. |
| 2015/0006207 | A1 | 1/2015 | Jarvis et al. |
| 2015/0056973 | A1 | 2/2015 | Efrati |
| 2015/0066360 | A1 | 3/2015 | Kirsch |
| 2015/0112545 | A1 | 4/2015 | Binion et al. |
| 2015/0112730 | A1 | 4/2015 | Binion et al. |
| 2015/0112800 | A1 | 4/2015 | Binion et al. |
| 2015/0172450 | A1 | 6/2015 | Singhal |
| 2015/0187016 | A1 | 7/2015 | Adams et al. |
| 2015/0187019 | A1 | 7/2015 | Fernandes et al. |
| 2015/0241226 | A1 | 8/2015 | Engelman et al. |
| 2016/0039426 | A1 | 2/2016 | Ricci |
| 2016/0047666 | A1 | 2/2016 | Fuchs |
| 2016/0050315 | A1 | 2/2016 | Malhotra et al. |
| 2016/0073240 | A1 | 3/2016 | Helm |
| 2016/0134744 | A1 | 5/2016 | de la Fuente Sanchez |
| 2016/0182707 | A1* | 6/2016 | Gabel .................. G06F 3/0482 455/404.2 |
| 2016/0231278 | A1 | 8/2016 | Goroshevskiy et al. |
| 2017/0122989 | A1 | 5/2017 | Ho |
| 2018/0158334 | A1 | 6/2018 | Perez Barrera et al. |
| 2018/0162410 | A1 | 6/2018 | Skillsater et al. |
| 2018/0362026 | A1 | 12/2018 | Heimberger et al. |

FOREIGN PATENT DOCUMENTS

| | | |
|---|---|---|
| JP | 2015169472 A | 9/2015 |
| WO | 2007008924 A2 | 1/2007 |
| WO | 2008001125 A1 | 1/2008 |
| WO | 2010011806 A1 | 1/2010 |
| WO | 2011004372 A1 | 1/2011 |

OTHER PUBLICATIONS

Jun. 2, 2011—"Drivers have an IQ, EQ and now with car insurance also a DQ" http://www.insurancechat.co.za/2011-06/drivers-have-an-iq-eq-and-now-with-car-insurance-also-a-dq/.

2016—"Driver Safety Quotient" http://www.geninfo.com/assessments/driver-safety-quotient.asp.

Shabeer, et. al, "Mobile Communication Safety on Road Transport," WSEAS Transactions on Communications, E-ISSN: 2224-2864, Issue 3, vol. 12, Mar. 2013, 12 pages.

"Drive Control—For When you Need a Little More Self Control," retrieved Apr. 8, 2016 from https://drivecontrolapp.com, 2 pages.

"Telematics: Reinventing Auto Insurance," retrieved Sep. 6, 2011 from http://www.insurancetech.com/blog/archives/2010/03/telematics_the.html, 10 pages.

Martin Demers, "Waste Fleet Safety: Influencing Driver Behavior" 2010 Waste Management Magazine, pp. 1-3.

Insurance Companies Utilizing Technology Fairbault Daily News, May 10, 2011, http://www.fairbault.com/print/11435 pp. 1-3.

"Continental Head-up Display Augmented Reality HUD" http://continental-head-up-display.com/ website last visited on Apr. 30, 2015.

"In the Future, Your Car's Windscreen Will Be an Augmented Reality Display" https://transportevolved.com/2014/09/29/future-cars-windscreen-will-augmented-reality-display/ website last visited on Apr. 30, 2015.

"Autonomous Cars from Berlin" website: http://autonomos-labs.com/research/ website last visited on Apr. 30, 2015.

Williams, Geoff—Should You Try Pay-As-You-Drive Insurance?, Jan. 13, 2014, http://money.usnews.com/money/personal-finance/articles/2014/01/13/should-you-try-pay-as-you-drive-insurance, U.S. News & World Report.

Rafter, Michelle—Use-Based Insurance Shifts Into High Gear, http://www.edmunds.com/auto-insurance/pay-as-you-drive-insurance-goes-into-high-gear.html, Feb. 27, 2014, Edmunds.

Chalon Smith, Mark—Pay-As-You-Drive Discounts: A Guide, http://www.insurance.com/auto-insurance/saving-money/low-mileage-discounts-guide.html, Apr. 22, 2015, Insurance.com.

How's My Driving?—http://www.economist.com/news/finance-and-economics/21572237-gizmos-track-driving-habits-are-changing-face-car-insurance-hows-my—Feb. 23, 2013—Print Edition of the Economist.

Usage-Based Insurance and Telematics, http://www.naic.org/cipr_topics/topic_usage_based_insurance.htm, Last Updated Dec. 14, 2015—National Association of Insurance Commissioners & The Center for Insurance Policy and Research.

Dewri, Rinku et al—Inferring Trip Destinations From Driving Habits Data, http://www.cs.du.edu/~rdewri/data/MyPapers/Conferences/2013WPES-Extended.pdf, Last Visited Feb. 25, 2016.

Rosolino, V. et al: "Road Safety Performance Assessment: A New Road Network Risk Index for Info Mobility", ScienceDirect: Procedia—Social and Behavioral Sciences 111 (2014) pp. 624-633.

Li, Z et. al.: "Road Risk Modeling and Cloud-Aided Safety-Based Route Planning", Published in Cybernetics, IEEE Translations dated Oct. 2, 2015, pp. 1-2.

"Road Asset Management", https://www.arrb.com/au/Infrastructure/Road-asset-management.aspx, Last visited Oct. 8, 2015, pp. 1-5.

Dec. 5, 2016 (WO)—International Search Report and Written Opinion—App. PCT/US2016/052877.

Feb. 2, 2017—(WO) International Search Report—App PCT/US2016/063527.

May 19, 2017 (WO) International Search Report and Written Opinion—App. PCT/IN2016/050370.

May 24, 2017—(WO) International Search Report and Written Opinion—PCT/IN16/50369.

"Axeda and Walsh Vision Announce Alliance for Cloud Telematics Solutions" retrieved Sep. 6, 2011 from http://www.cbs19.tv/story/15234817/axeda-and-walsh-vision-announce-alliance-for-cloud-telematics-solutions pp. 1-4.

"Usage-Based Auto Insurance (UBI): A Revolution Is Underway. Is Your Company Ready?", Robin Harbage, FCAS, MAAA, published Dec. 2011, Copyright Towers Watson (hereinafter Harbage), Year 2011.

May 24, 2019—(EP) Extended Supplemental Search Report—EP Application No. 16849502.6.

"Junior: The Stanford Entry in the Urban Challenge", Michael Montemerlo et al., Journal of Field Robotics, vol. 25, No. 9, Sep. 1, 2008, pp. 569-597, XP055169616.

"Moving Object Detection with Laser Scanners", Christoph Mertz et al., Journal of Field Robotics, vol. 30, No. 1, Jul. 3, 2012, pp. 17-43, XP055460334.

Sep. 6, 2019—(EP) Extended Search Report—Application No. 16891883.7.

Apr. 18, 2017—(WO) International Search Report—PCT/IN2016/050355.

Mar. 2, 2020—(EP) Partial Search Report—App. No. EP16918214.
Mar. 18, 2020—(EP) Partial Search Report—App. No. EP16918215.
Mar. 10, 2020—(EP) Partial Search Report—App. No. EP16918216.
Jun. 23, 2020—(EP) Extended Search Report—App. No. EP16918214.

"Warn me now or inform me later: Drivers' acceptance of real-time and post-drive distraction mitigation systems," by Shannon C. Roberts, Mahtab Ghazizadeh and John D. Lee, International Journal of Human-Computer Studies 70 (2012), Available online at www.sciencedirect.com (Year: 2012).

* cited by examiner

PARTITIONING SENSOR BASED DATA TO GENERATE DRIVING PATTERN MAP

TECHNICAL FIELD

Aspects of the disclosure generally relate to the calculation and utilization of a driving quotient. In particular, various aspects of the disclosure relate to calculation of a driver rating based on population and driving patterns.

BACKGROUND

It is beneficial to know an individual's driving score (performance) when assessing the driver for, for example, insurance coverage. However, an individual driving score may not provide a complete picture as such score may not consider the individual driver relative to other drivers.

Telematics may be described as use of technology to communicate information from one location to another. Telematics has been used for various applications, including for the exchange of information with electronic sensors. As telematics technology has progressed, various communication methodologies have been incorporated into automobiles and other types of vehicles.

One example of telematics systems currently in use in automobiles are on-board diagnostics (OBD) systems. From early versions of OBD systems that included crude implementations of control for features such as fuel injection to more sophisticated and standardized OBD-I and OBD-II units, these units have served as an electronic gateway into the health of a vehicle. These systems have allowed users to monitor a wide variety of engine sensors and systems, including emissions control, coolant temperature, engine RPM, vehicle speed, timing advance, throttle position, and oxygen sensing, among other things. Moreover, handheld units, mobile devices, personal computers, data loggers, and other devices may be connected to the OBD systems to serve as the interface for displaying data outputted by the OBD system. Data obtained from OBD systems has been used for a variety of purposes, including maintenance, diagnosis, and analysis.

SUMMARY OF THE INVENTION

Aspects of the disclosure relate to methods and systems for calculating and utilizing a driving quotient. In at least one embodiment, a plurality of real-time driving data or inputs is captured by a telematics device. The real-time driving inputs may include one or more of one or more of speed, acceleration, braking, steering, user of turn signals, user of seat belts, use of radio, use of a phone, location, miles driven, type of trip, engine status, oil level, tire pressure, number of passengers, and lane departures. One or more driving conditions may be received. The driving conditions may be one or more of weather, road conditions, type of road, and time of day. This data is collected for a plurality of drivers as well as for an individual driver. A processor partitions the data from the plurality of drivers to create a driving pattern map such as a distribution curve. For example, the processor tiers particular driving patterns with driver ratings. From this data and resulting driving pattern map, and data from an individual driver, a processor may calculate a driving quotient for the individual driver. The driving pattern map and driving quotient may be based at least in part on the plurality of real-time driving inputs and the one or more driving conditions from both the plurality of drivers and the individual driver. The driver quotient is a relative score identified for every driver compared with population of other drivers. The calculated driving quotient may be sent to one or more devices, such as a portable device.

The driving quotient may be sent to one or more third parties. The third parties may be one or more of a financial institution, an insurance company, a credit agency, a department of motor vehicles. The third party may utilize the driving quotient in aspects of its business. The driving quotient may be sent to and stored on a device. The device may be a computing device or may be a portable device, such as a cell phone. Validation of the driving quotient may occur through additional monitoring of the driver and updating the driver quotient periodically to see whether the driver performance has changed. Validation may occur by utilizing tests provided to the driver before or during gathering of data such as via telematics.

In at least one embodiment, the driving quotient is displayed to the driver. The driving quotient may be displayed on a device belonging to the driver, such as a cell phone. Alternatively, the driving quotient may be displayed on an item within a vehicle, such as a windshield or rearview mirror. The driving quotient may be a numerical, alphabetical, or graphical value.

In at least one embodiment, a driving report is generated. The driving report may be sent to one or more individuals and/or entities. For example, the driving report may be sent to an insurance company or the driver. The driving report may contain information relating to the real-time driving inputs collected and the driving conditions received. The driving report may also include information relating to the driving quotient and the habits of the driver. The driving report may also include recommendations relating to the driver's habits and or the effects of the driver's habits. The driving report may also include the number of driving events, duration of each event, total number of driver hours the driving quotient is based on, and the total time period for which data has been collected on the driver. The driving may include whether the driving quotient has improved or deteriorated over time.

In at least one embodiment, the driver quotient is used by the system to advise a current driver of other drivers in the area, for example, other drivers that have a driver rating below that of the current driver. The system may provide recommendations to the current driver such as to leave a greater distance between vehicles or to take a different route to avoid such drivers.

In another embodiment, the system is used to monitor current driving of a driver, periodically or continuously revise the driver's driving quotient, and notify the driver if the driving quotient changes significantly. The system may offer penalties or rewards to induce drivers to change their behavior if the change of driving quotient is significantly lowered. The system may also award good driving behavior by offering a reduction in insurance rates, for example.

In at least one embodiment, the driver quotient can be used to determine whether a current driver is the driver assigned the driver quotient.

BRIEF DESCRIPTION OF THE DRAWINGS

The present disclosure is illustrated by way of example and is not limited in the accompanying figures in which.

DETAILED DESCRIPTION OF THE INVENTION

Aspects of the disclosure relate to methods, computer readable media, and apparatuses for using telematics data and external data to calculate and utilize a driving quotient for a driver of a vehicle.

Figure 1:
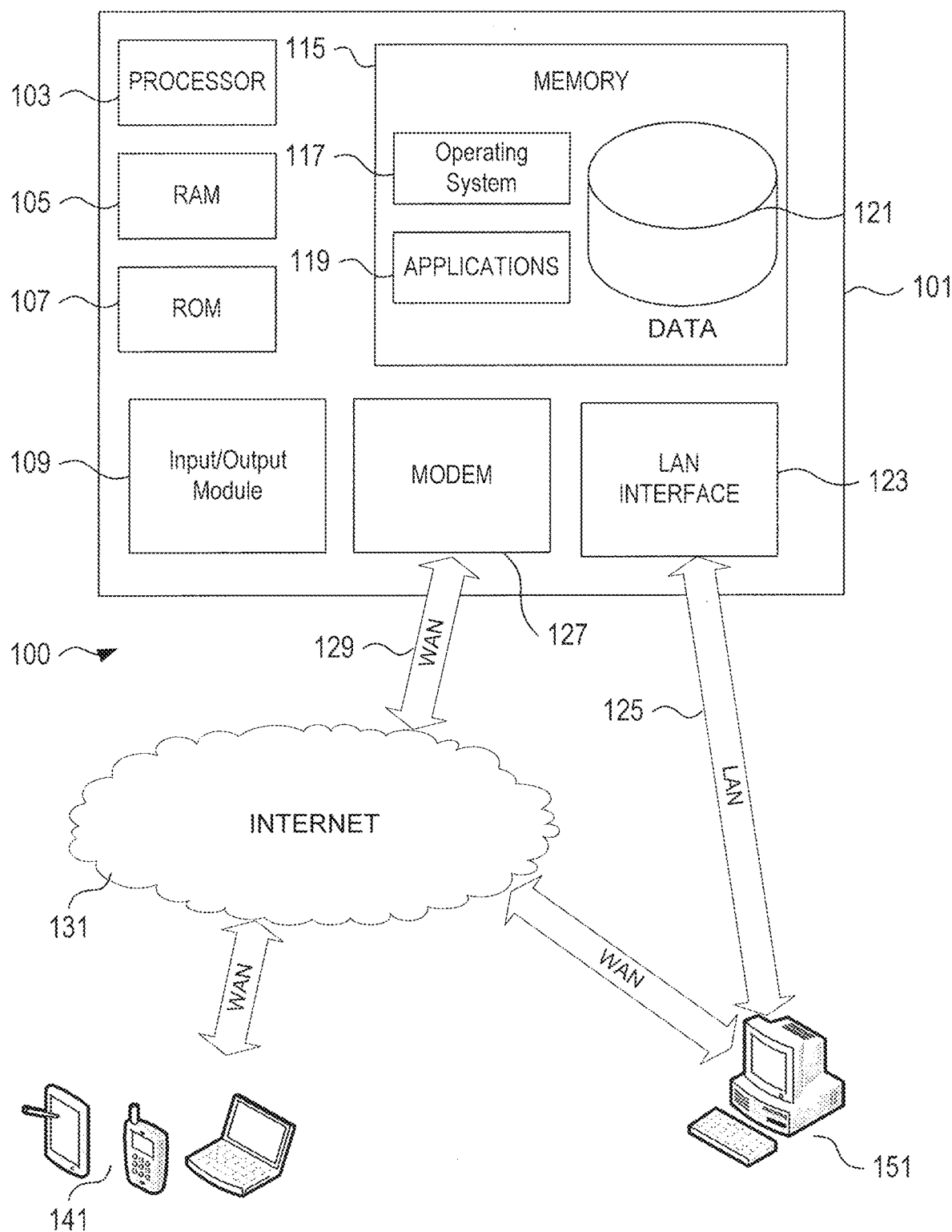
FIG. 1 shows a system involving an illustrative device through which various aspects of the disclosure may be implemented.

FIG. 1 illustrates a block diagram of a telematics device 101 (e.g., a computing device) in communication system 100 that may be used according to an illustrative embodiment of the disclosure. The device 101 may have a processor 103 for controlling overall operation of the telematics device 101 and its associated components, including RAM 105, ROM 107, input/output module 109, and memory 115. In certain embodiments, device 101 physically resides in an item (e.g., a vehicle, a mobile telephone, etc.) and receives information from sensors or other measurement devices incorporated into the item, and in other embodiments, device 101 may communicate from a remote location to sensors within an item.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to read, store, and analyze various details about an item's operating parameters. For instance, the device 101 may capture data related to the real-time driving data of a driver of a vehicle. The device 101 may capture information related multiple parameters simultaneously and/or in real-time.

The device 101 may operate in a networked environment supporting connections to one or more remote computers, such as terminals 141 and 151. The terminals 141 and 151 may be personal computers, smart phones, tablets, laptops, or servers that include many or all of the elements described above relative to the device 101. Alternatively, terminal 141 and/or 151 may be storage servers for storing data associated with device 101. The network connections depicted in FIG. 1 includes a local area network (LAN) 125 and a wide area network (WAN) 129, but may also include other networks. When used in a LAN networking environment, the device 101 is connected to the LAN 125 through a network interface or adapter 123. When used in a WAN networking environment, the device 101 may include a modem 127 or other means for establishing communications over the WAN 129, such as the Internet 131. It will be appreciated that the network connections shown are illustrative and other means of establishing a communications link between the computers may be used. For example, the device 101 may communicate wirelessly with other computing systems and receivers. The existence of any of various well-known protocols such as TCP/IP, Ethernet, FTP, HTTP and the like is presumed.

Additionally, an application program 119 used by device 101 according to an illustrative embodiment of the disclosure may include computer executable instructions for invoking functionality related to capturing data associated with an item's operational state through sensors present on or around the item, processing this data, and/or storing the data locally and/or remotely. Device 101 and/or terminals 141 or 151 may also be mobile terminals including various other components, such as a battery, speaker, and antennas (not shown).

The disclosure is operational with numerous other general purpose and/or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable user electronics, network PCs, minicomputers, mainframe computers, mobile telephones, smart phones, and distributed computing environments that include any of the above systems or devices, and the like.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
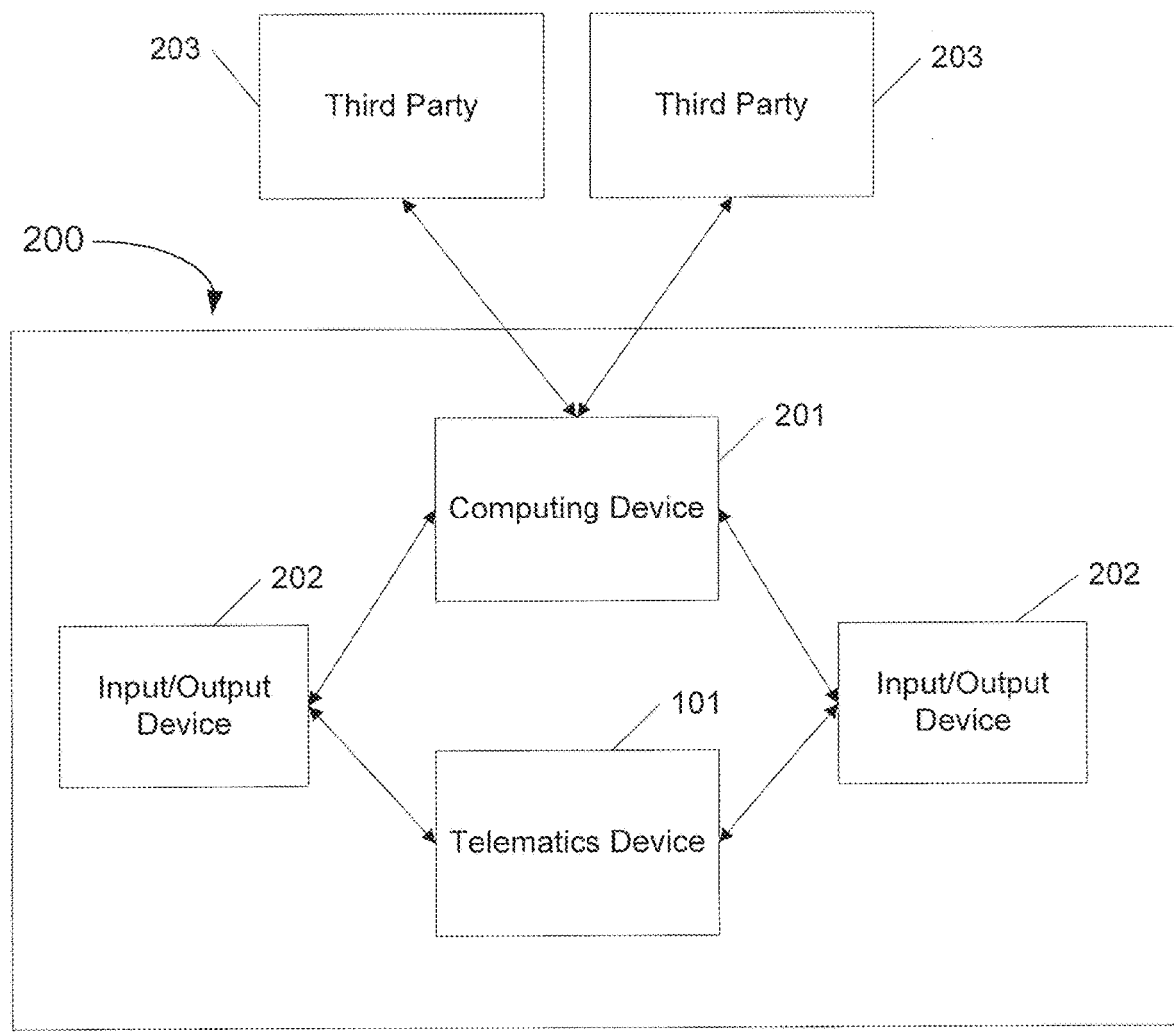
FIG. 2 is an illustrative block diagram of a system that may be used to implement the processes and functions of certain aspects of the present disclosure.

Referring to FIG. 2, an illustrative system 200 for implementing methods according to the present disclosure is shown. As illustrated, system 200 may include a telematics device 101, a computing device 201, and one or more input/output devices 202. Computing device 201 may be a computing device for processing data generated by telematics device 101 and calculating a driving quotient based on the processed data. Computing device 201 may receive data from a variety of input/output devices 202, including vehicle telematics data, smartphone telematics data, data from service providers, and/or demographic/descriptive data from third parties 203. Computing device 201 may reside either remotely or local to an item in which device 101 resides. If computing device 201 resides local to the item along with telematics device 101, computing device 201 may be integrated with telematics device 101.

Computing device 201 may possess many of the same hardware/software components as telematics device 101 shown in FIG. 1. For instance, the computing device 201 may be used by a program manager and/or insurance provider associated with the item which accompanies telematics device 101 to apply various business logic rules for determining a driving quotient for one or more drivers. The program manager may be a separate entity that may oversee implementation and validation of a driving quotient program. Alternatively, the program manager may be one of the service providers already involved in the driving quotient program, including an insurance provider, original equipment manufacturer (OEM), maintenance provider, or other service provider. The program manager may be an entity that enables data exchange and transaction processing between all parties involved in a driving quotient program.

The telematics device 101 may capture or receive any type of data relating to real-time driving. For example, the telematics device 101 may collect data relating to the driver's speed, acceleration of a vehicle, braking of a vehicle and/or anti-lock braking system application, and/or steering of a vehicle. The telematics device 101 may collect data relating to the vehicle, such as airbag deployment, anti-theft system disablement, use of headlights, whether the back-up lights turn on, whether the brake lights are on, door opening, door locking, use of cruise control, use of hazard lights, use of wipers, horn application, whether turn signals are used, whether seat belts are worn, whether a driver plays the radio, and/or talks on a telephone. The telematics device 101 may also capture data relating to the observance of traffic signals and signs. The telematics device 101 may also collect data relating to other vehicles, such as the presence and distance of vehicles on the side, front or back of the vehicle being monitored.

Additionally, the telematics device 101 may capture data relating to vehicle maintenance, such as the engine status, oil level, engine coolant temperature, odometer reading, the level of fuel in a tank, engine revolutions per minute (RPM), and/or tire pressure. The type of vehicle driven may also be recorded. The type of vehicle driven may be determined from the vehicle itself or by accessing data from an entity, such as an insurance policy. If a driver has more than one vehicle available to drive, the choice of vehicle may be collected. The choice of vehicle may be determined by accessing data that lists the available vehicles, such as an insurance policy, and/or data from the vehicle itself.

The telematics device 101 may be configured to collect data regarding the passengers of the vehicle. For example, the number of passengers or types of passengers (e.g. adults, children, teenagers, pets, etc.) may be collected. The driver's route choice, whether the driver follows a given route, type of trip (e.g. commute, errand, new route, etc.) or whether the driver stays within the lane may be collected. In at least one embodiment, the telematics device 101 is configured to communicate with sensors and/or one or more cameras in a vehicle that determine whether the vehicle stays within a lane or strays into other lanes. The telematics device 101 may be configured to collect data from a vehicle when the vehicle prevents the driver from performing an action (e.g. changing lanes when a car is in a new lane, speeding, etc.)

The telematics device 101 may also be configured to collect data relating to a driver's movements or the condition of a driver. For example, the telematics device 101 may include or communicate with sensors that monitor a driver's movements, such as the driver's eye position and/or head position, etc. Additionally, the telematics device 101 may collect the condition of a driver, such as fatigue or intoxication. The condition of the driver may be determined through the movements of the driver or through sensors, for example, sensors that detect the content of alcohol in the air or blood alcohol content of the driver, such as a breathalyzer.

The telematics device 101 may collect or receive the real-time data from any type of input or output device 202. For example, the telematics device 101 may receive data from a mobile telephone, a Global Positioning System (GPS), sensors positioned inside a vehicle, or sensors or devices remote from the vehicle. The sensors may include any type of sensors, such as body sensors and electrical sensors. The telematics device 101 may also be configured to send the data or driving quotient to one or more output devices 202. For example, the telematics device 101 may send the driving quotient to a cell phone. Additionally or alternatively, the telematics device 101 may be configured to display the driving quotient within the vehicle. For example, the telematics device 101 may project the quotient on a vehicle's windshield or on the rear view mirror.

The driving quotient may be stored by the computing device 201 or may be sent to a separate processor or server for storing. Alternatively, the driving quotient may be stored in the memory of an input/output device 202, such as a cell phone. In at least one embodiment, the driving quotient may be stored in a portable device and transferred from the portable device to another device. For example, the driving quotient may be stored in a driver's mobile telephone and transferred to a device, such as a computer, at the department of motor vehicles.

In at least one embodiment, the telematics device 101 can determine the driver of the vehicle. The driver may be determined by any suitable means. For example, the driving behavior of the driver may determine the driver, each driver may have a specific key fob to start the vehicle, or sensors within the telematics device 101 or vehicle may determine the driver. This may be done in any suitable manner. For example, the weight of the driver may be sensed. The telematics device 101 may also identify the driver through voice recognition, codes, fingerprint or retinal recognition, etc.

The telematics device 101 or computing device 201 may also capture or receive external data such as the location of the vehicle, weather, the traffic, the type of road, barometric pressure, and/or the time of day the vehicle is being driven. The external data may be collected from components within a vehicle or received from a third party 203. The number of miles driven, number of miles driven at certain times of the day, the number of miles per trip, the duration of the trip, the number of trips over a certain time, such as a day, month, or week, and/or the time of day the vehicle is driven may also be collected and/or received. In at least one embodiment, the driver's quotient may be generated and assigned to an autonomous car based on the autonomous car's driving performance.

The computing device 201 may calculate the driving quotient in any suitable manner. For example, the computing device 201 may apply weights to any of the collected or received data described above. The driving quotient may take into account data relating to the driver. For example, the driving quotient may take into account the driver's age, the driver's medical history and/or the driver's vision. The driving quotient may increase or decrease based on the real-time data collected by the telematics device 101 and the external data received. For example, if a driver consistently abides by the posted speed limits, wears a seatbelt, and keeps the vehicle in good repair, the driver's quotient may be increased. Alternatively, if the driver regularly speeds, does not repair the vehicle, and regularly brakes hard, the driver's quotient may be negatively affected.

The driving quotient may be any type of relative value, such as a numerical or alphabetical value. For example, the driving quotient may be a number between 0 and 160, or a quotient between 0 and 1.0, a letter grade, such as A, B, C, D, or F, with plus/minus gradients. In a particular aspect, the driving quotient may be classified based on numerical ranges.

In at least one embodiment, a validating agency may validate the driving quotient calculated by the computing device 201. The driving quotient may be validated by verifying the accuracy of the collected real-time data inputs or external data. Additionally, the driving quotient may be validated by verifying the calculation of the driving quotient and the output, i.e. value of the driving quotient. In at least one embodiment, the validating agency may be an insurance company. The validating agency may standardize the driving quotients and/or rules and algorithms for calculating the driving quotient and may provide the driving quotients to other agencies or entities. The validating agency may charge a requesting agency or entity for receiving driving quotients. The requesting agencies or entities may be charged on a usage basis or subscription basis.

The telematics device 101 may include an alert device that provides an audible or visual alert. For example, the telematics device 101 may send a text or SMS message to a mobile phone or may send email to a driver to give the driver feedback about the driving. The alert may be sent at any time. For example, the alert may be sent in real-time, e.g. at the time of an event. Alternatively, a driving report may be generated. The driving report may be sent to one or more third parties, such as the driver, an insurance agency, a credit agency, and/or a governmental agency. The driving report may be sent at any time. In one embodiment, the driving report is sent at a predetermined frequency, for example monthly or weekly. The audible alert may be a tone or a voice that beeps when a specific event happens, such as a driver exceeding a speed limit or a voice that instructs the driver that the vehicle is travelling above the speed limit. A driver may be alerted, in the driving report or through the audible or visual alert of his or her driving quotient, his or her driving habits, and/or the effect of the driver's habits. The effect of the habit may include any type of information, such as information relating to the damage to or wear upon a vehicle or the effect of the driver's habits on the driving quotient. For example, the driver may be alerted that frequent hard braking is negatively affecting his/her driving quotient and/or may cause excessive wear to the brake pads.

The driving quotient may be utilized in any suitable way. For example, a driving quotient may be used to rent a car. Generally, a driver must be over the age of 25 to rent a car. However, car rental agencies may use the driving quotient to remove the age requirement for renting a car. For example, a car rental agency may allow anyone with a driving quotient above a certain threshold to rent a car. Alternatively, or additionally, the driving quotient may be used by the car rental agencies to determine a rental rate or an insurance rate for a rental car.

The driving quotient may be used by employers that require an employee to drive a vehicle (e.g. a taxi, trucker, delivery person, etc.). The employer may submit a request for a driver's driving quotient to the entity that collects and/or verifies the driving quotient, such as an insurance agency.

The driving quotient may be used by government agencies, such as the department of motor vehicles (DMV). The DMV may use the driving quotient in lieu of a driver taking a driving test. In this embodiment, the DMV may require a driver to log a specific number of hours driving and/or reach a threshold driving quotient. If the DMV's requirements are reached, the DMV may issue a license or a probationary license to a driver. The DMV may also require a driver that has a license to maintain a driving quotient above a threshold to keep his/her license. The driving quotient may be checked periodically by the DMV to determine whether the driver's quotient is above the threshold limit. If the driver's quotient falls below a threshold limit, the driver's license may be revoked, the driver may receive a ticket, and/or or the driver may be required to attend driving classes or driving training.

The driving quotient may be used and accepted by all insurance companies. The insurance companies may use the driving quotient to determine an appropriate insurance policy or an appropriate rate for an insurance policy of a customer. In at least one embodiment, the driving quotient may be used by a customer to evaluate and select the best insurance policy from a plurality of insurance companies.

The driving quotient may be sent to credit agencies and used in establishing or altering a credit quotient. The driving quotient may also be used in credit card, mortgage, lease, loan, and/or school applications for individuals who have little to no credit. For example, the driving quotient may be used as a predictor for determining whether the applicant will fulfill his or her obligations. As described in U.S. Pat. No. 8,086,523, which is incorporated by reference herein in its entirety, a user's credit quotient or may be generated by a statistical credit-scoring model, which is used to objectively evaluate information that pertains to making a credit or credit-related decision. The statistical model may consider conventional credit risk information (e.g., a user's FICO quotient, payment history, length of credit history, amount owed, types of credit used, new credit, etc.) as well as a driving quotient to calculate credit quotient.

The driving quotient may be used to prevent individuals from driving in certain areas or drivers may be charged for entering certain areas. Additionally, the driving quotient may be used by an agency, such as a governmental agency, to tax a driver. The tax may relate to gas taxes, taxes for using a certain road, and/or taxes for driving at a certain time or using a certain road at a specific time.

The steps that follow may be implemented by one or more of the components in FIGS. 1 and 2 and/or other components, including other computing devices.

Figure 3:
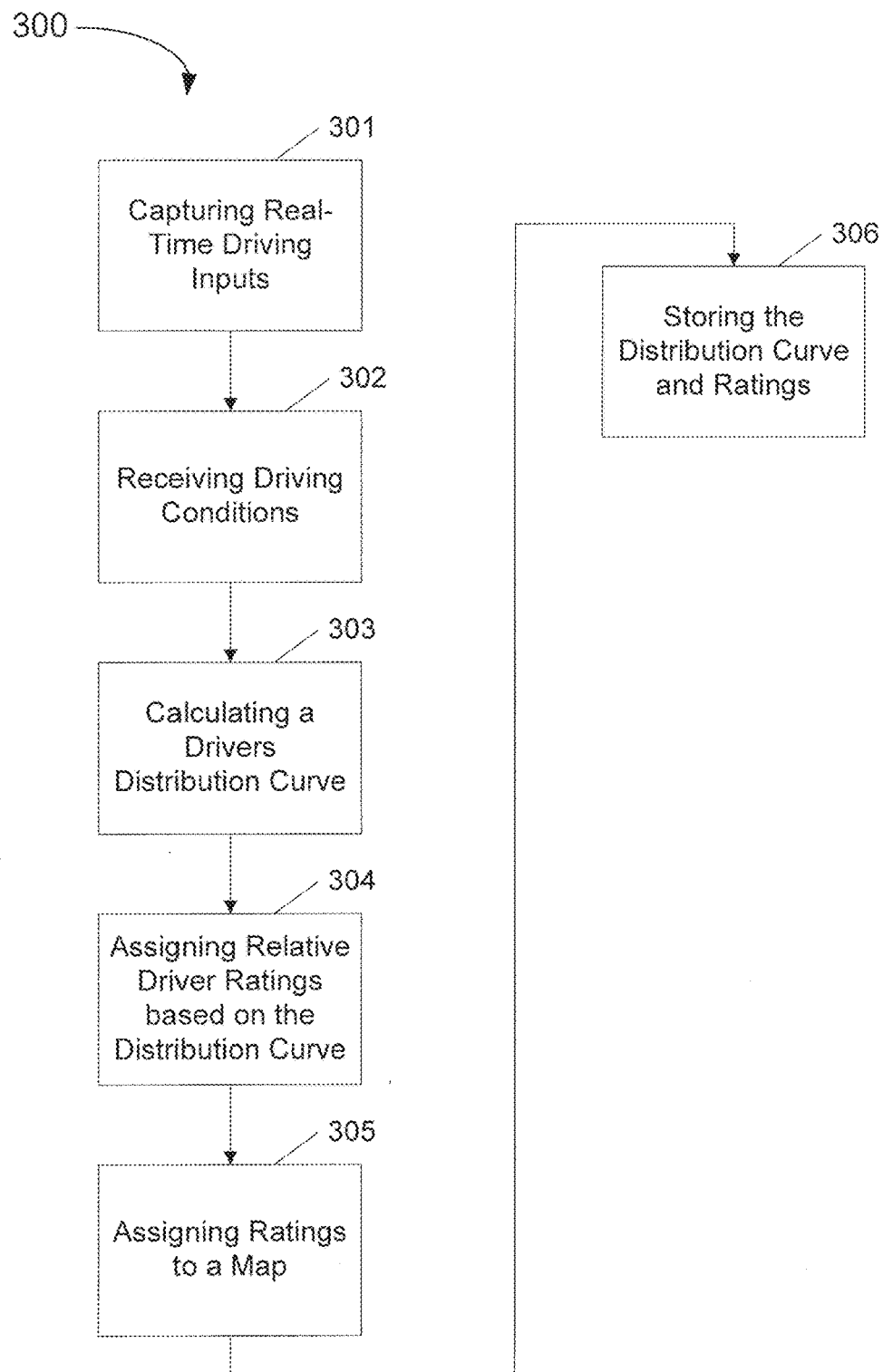
FIG. 3 illustrates a method for partitioning of a driving pattern map (distribution curve) based on a population of drivers and tiering relative driver ratings based on the curve in accordance with certain aspects of the disclosure.

FIG. 3 illustrates a method 300 of calculating and utilizing a driving pattern map (e.g. a distribution curve) that associates particular driving patterns to driver ratings according to one or more aspects of the invention. As illustrated in step 301, telematics device 101 captures real-time driving inputs for each of a plurality of drivers. The plurality of drivers should represent the population of drivers; therefore, it is preferable to have the distribution curve be based on the largest number of drivers possible. Such inputs may include, but are not limited to, the number of hard brakes, number of over speeding, or phone use.

Ideally the map is based on a minimum number of valid trips per driver, such as 100 valid trips per driver. Trips that are not considered valid trips may be trips under a certain distance, for example under 5 miles or trips having a duration of less than 10 minutes. If there trips that contain parameters (e.g. hard braking or over speeding) outside a selected standard deviation, then those trips may likewise not be considered valid trips.

The data collected for assessment of a driver quotient for an individual driver (See FIG. 4) can also be used to revise the map of the population of drivers as such individual driver is also part of the population of drivers.

In step 302, external or driving conditions may be captured or received, as discussed above. The external or driving conditions may be provided by a third party, may be determined from databases or files, and/or may be captured by the telematics device 101.

Figure 5:
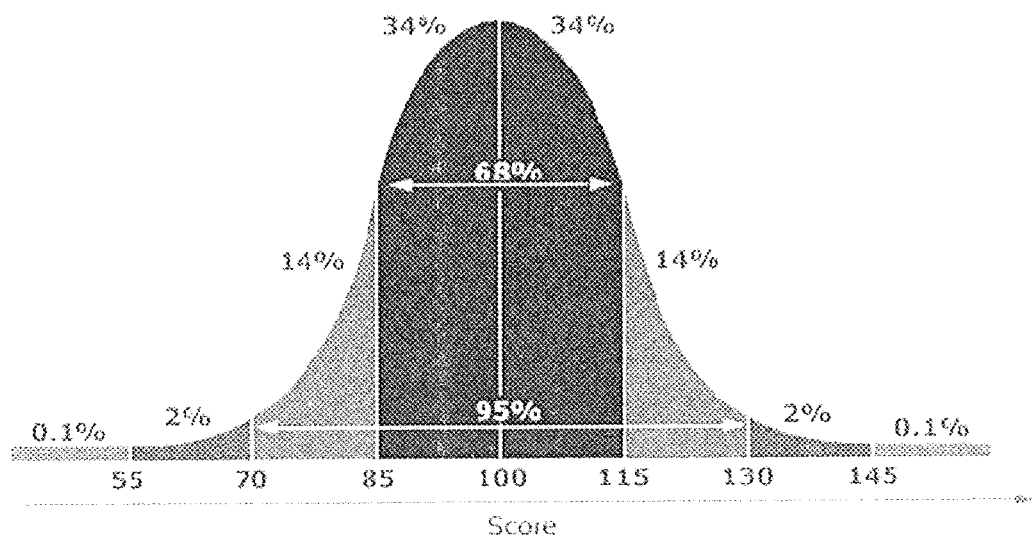
FIG. 5 illustrates a driving pattern map (distribution curve) of a population of drivers that may be used to calculate a driving quotient for individual drivers.

In step 303, the computing device 201 partitions (calculates or generates) a map, e.g. a distribution curve, of driving patterns based on the plurality of drivers, as discussed in detail above. The map may be based at least in part on the real-time driving inputs and the external or driving conditions captured and/or received in steps 301 and 302. The map may be any numerical, alphabetical, or graphical value. An example map is found in the distribution curve of FIG. 5. Then in step 305, driver quotient ratings are assigned to the maps. For example, ratings may be identified as follows:

| Driver Quotient Rating | Classification |
|---|---|
| Above 145 | Superior |
| 130-145 | Excellent |
| 115-130 | Very good |
| 85-115 | Good |
| 70-85 | Poor |
| Below 70 | Bad |

As illustrated in step 306, the distribution curve and ratings may be stored. The distribution curve and ratings may be stored on any type of device including memory. For example, the computing device 201 and/or input/output devices 202 may store the distribution curve and ratings.

Figure 4:
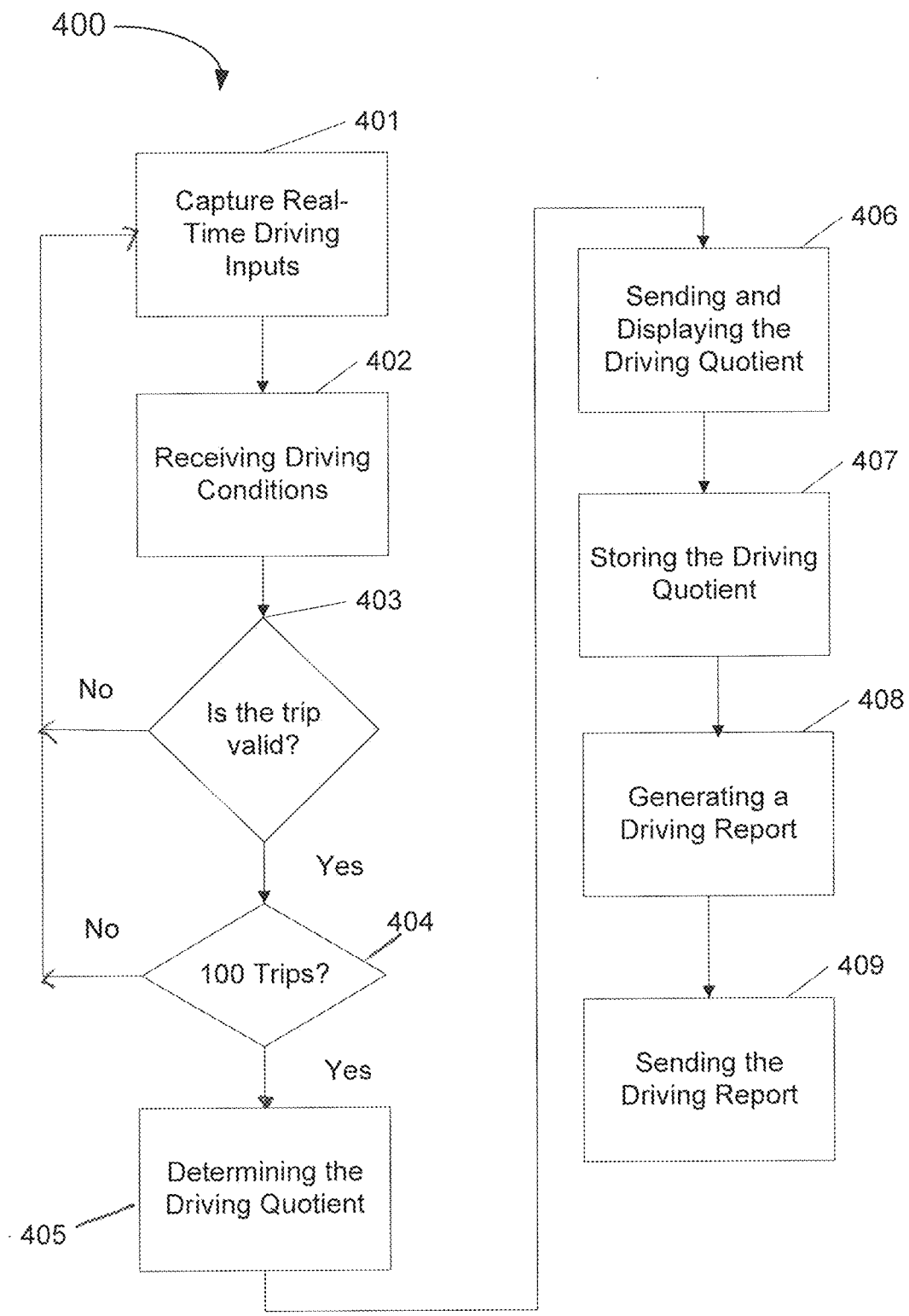
FIG. 4 illustrates a method for calculating and utilizing a driving quotient for an individual driver in accordance with certain aspects of the disclosure.

FIG. 4 illustrates a method 400 of calculating and utilizing a driving quotient according to one or more aspects of the invention. As illustrated in step 401, a telematics device 101 captures real-time driving inputs for a driver for each trip a driver makes, as discussed in detail above. In step 402, external or driving conditions may be captured or received, as discussed above. The external or driving conditions may be provided by a third party, may be determined from databases or files, and/or may be captured by the telematics device 101.

In step 403, it is queried whether the trip is valid. For example, trips may not be valid if under 5 miles, less than 10 minutes in duration, or provide an anomaly in the data. If the answer is no, step 401 is repeated for another trip. If the answer is yes, then in step 404, it is queried whether there have been 100 valid trips. If no, step 401 is repeated for another trip.

In step 405, the computing device 201 calculates or generates a driving quotient for the driver, as discussed in detail above. The driving quotient may be based at least in part on the real-time driving inputs and the external or driving conditions captured and/or received in steps 401 and 402 as well as a driving pattern map, such as map prepared in accordance with the steps of FIG. 3.

In step 406, the driving quotient may be sent and then displayed to an individual and/or an entity. For example, the driving quotient may be sent to a computing device, an input/output device 202, such as a portable device, the driver, or an insurance or governmental agency. The driving quotient may be displayed on any type of device. For example, the driving quotient may be displayed on a computing device, cell phone, key fob, or may be displayed on items within the vehicle, such as the windshield or rearview mirror. As illustrated in step 407, the driving quotient may be stored. The driving quotient may be stored on any type of device including memory. For example, the computing device 201 and/or input/output devices 202 may store the driving quotient. In at least one embodiment, the driving quotient is stored in the non-volatile memory of a cell phone or a key fob for a vehicle.

The computing device 201 may generate a driving report for one or more drivers, as illustrated in step 408. The driving report may contain any type of information. For example, the driving report may contain the driver's name, the vehicle(s) driven, the driving quotient, the driving habits of a driver, and/or the effect of the driver's driving habits on the vehicle. Additionally or alternatively, the driving report may contain information regarding the calculation of the driving quotient and or the potential changes to the driving quotient based on the information within the driving report. As an example, the driving report may contain information such as the name and an identifier of the driver, such as a driver's license number, the vehicle description, the driver's habits, such as excessive braking and routine speeding, and the effects of the excessive braking to the vehicle and the potential decrease to a driver's quotient because of the excessive braking and routine speeding. As illustrated in step 309, the driving report may be sent to individuals or entities. For example the driving report may be sent to the driver or may be sent to an insurance agency or credit agency, as discussed above.

The driving quotient is a unique relative score identified for each driver on comparison with complete population (data set). Various parameters may be used for calculating the driver quotient such as hard braking or over speeding. Other parameters may include phone calls or other distractions, duration of driving, and number and duration of breaks.

EXAMPLE 1

Two parameters are identified for driving quotient calculation, namely hard braking and over speeding. Each user/driver must have minimum number of valid trips, for example 100 valid trips, to be eligible for a driving quotient. The calculated driving quotient is valid for a given amount of time, for example, 6 months or until a second minimum number of valid trips are accumulated, such as 100 trips, whichever is earlier. Two subsequent driving quotients would be smoothed to +/−2%. Because a driving quotient is a relative score of a population of drivers, the driving quotient is smoothed to remove the spikes due to external events and may be not purely due to driving behavior.

Outliers would be determined and not utilized in the driving quotient calculation, for example, trips with more or less than 3 standard deviations for hard brake and over speeding and trips of less than 5 miles. Such outliers would not be considered valid trips.

The driving quotient may be calculated as follows:
First: The two parameters over speeding count and hard braking count for each trip are normalized to per 100 miles. For example, a person travelled 12 miles a trip with 2 hard brake and 3 over speeding counts. A normalized value of hard brake per 100 miles would be=2*100/12=17 (Rounded off to nearest integer) A normalized value of over speeding per 100 Miles=3*100/12=25 (Rounded off to nearest integer).
Second: The population mean and standard deviation are calculated for speeding and hard braking.
Third: From the normalized hard braking and over speeding, the valid trips are flagged. The latest 100 valid trips are identified for each user.
Fourth: The population minimum and maximum for speeding and hard braking are then calculated.
Fifth: The relative normalized score for hard braking (HB) and over speeding (OS) based on population minimum and maximum are calculated. (Actual-Minimum)/Maximum-Minimum).
Sixth: To keep the driving quotient mean @100, the score of each hard brake and over speed is multiplied with 200 giving weightage of 50% each. The hard brake score*200*50%+over speeding score*200*50%= final driving quotient.

EXAMPLE 2

A particular aspect of the invention relates to a driver apparatus configured to advise a driver of behavior of surrounding drivers, for example, whether other drivers may be poor drivers. The behavior of the drivers is based on each of their calculated driver quotients. An electronic device integrated with a vehicle (e.g., a vehicle's dashboard) or a portable electronic device (hereinafter both referred to as "portable electronic device") such as cell phone, a tablet, or a GPS unit associated with a current driver may be configured for displaying to the current driver a notification when the portable electronic device receives a signal. A processing unit contains a processor for executing computer-executable instructions and a memory unit stores computer-executable instructions, which when executed by the processing unit, cause the processing unit to perform a method for analyzing location of drivers and driver quotients.

The portable electronic device transmits to the processing unit the location of the current driver. The processor unit also communicates with electronic portable devices of other drivers, for example, other drivers within, for example, a predetermined radius of the current driver, for example, a radius of 0.2, 0.25, 0.3, 0.35 0.4, 0.45, or 0.5 mile. The processing unit maintains a list/table with updated locations of all drivers associated with the system. The processing unit communicates updated locations back to each individual portable electronic device so each driver knows the whereabouts of other drivers. In an alternative embodiment, each portable electronic device can actually "detect" other devices near it by using some type of short-range (or mid-range) wireless communication technology such as Bluetooth or WiFi.

The processing unit also maintains a list/table of driving quotients of each of the drivers. The processing unit can communicate to the current driver its own driver quotient as well as the driver quotients for each of the nearby drivers. The other drivers may be identified simply by their driver quotient and location. Alternatively, a color code system may be used to identify other drivers, for example, color icons of cars could be used to identify poor drivers.

In one aspect, the processor unit determines if the driving quotient of more than 50% of the nearby drivers is more than 1 standard of deviation lower than the driving quotient of the current driver and if so, the processor transmits a notification to the portable electronic device of the current driver conveying this information. The processor then provides recommendations to the portable electronic device of the current driver for dealing with the driving of such drivers such as maintaining a greater following distance from other drivers or discouraging lane changes or providing an alternate route having a current flow of drivers that do not have such drivers. The portable electronic device may detect if the current driver has followed the recommendations.

In another alternative embodiment, the portable electronic device itself can calculate the driving quotient for the current driver. Thus the portable electronic device generates or updates a driving quotient for the current driver and then displays the driving quotient to the driver. In another alternative embodiment, the portable electronic device itself can communicate with portable electronic devices of other drivers, transferring location and driver quotient information to and from the portable electronic devices.

EXAMPLE 3

Another aspect relates to a driver apparatus configured to modify current driving behavior of a driver, wherein the driver has an assigned driver quotient. A portable electronic device is configured to display to a driver a notification when the portable electronic device receives a signal or transmission from a processing unit or server.

A processing unit contains a processor for executing computer-executable instructions and a memory unit stores computer-executable instructions, which when executed by the processing unit cause the processing unit to perform a method for calculating a driving quotient based on current driving behavior.

A plurality of real-time driving inputs is captured for a driver of a vehicle by the portable electronic device and transmitted to the processing unit. The processor calculates a revised driving quotient based at least in part on the plurality of real-time driving inputs and the one or more driving conditions. The processor determines if the driving quotient is more than X standard of deviation lower or higher than the assigned driving quotient of the driver. For example, X may be, but not limited to 0.5, 1, 1.5, 2, or 2.5.

The processor transmits a notification to the portable electronic device of the driver if the driving quotient is more than X standard of deviation lower or higher than the assigned driving quotient of the driver. The processor provides recommendations for the driver by transmitting the recommendations to the portable electronic device based on the revised driving quotient. The recommendations depend on the value of X and whether the driving quotient has gone up or down. For example, X may be 1 or 2.

If the revised driving quotient is more than 1 standard of deviation lower than the assigned driving quotient of the driver, then the unit processor notifies the driver through the portable electronic device of the revised score and the behavior that caused the revised score. The behavior may be, for example, hard braking or over speeding. The unit processor notifies the driver through the portable electronic device of recommended actions depending on the behavior that caused the revised score and, optionally, consequences of not following the recommended actions such as increasing insurance rates.

If the revised driving quotient is more than 2 standard of deviation lower than the assigned driving quotient of the driver, then the unit processor notifies the driver through the portable electronic device of the revised score and the behavior that caused the revised score. The unit processor notifies the driver through the portable electronic device of recommended actions depending on the behavior that caused the revised score. If the driver does not respond to the notification, the unit processor may issue instructions to the driver's vehicle to bring the vehicle to a slow stop or notify local police.

If the revised driving quotient is more than 1 standard of deviation higher than the assigned driving quotient of the driver, then the unit processor notifies the driver through the portable electronic device of the revised score and the behavior that caused the revised score. For example, the behavior may be less than 2 hard braking events and driving within 2 miles per hour of a posted speed limit during a time period. The processor unit may provide the driver through the portable electronic device an icon indicating good driving behavior, a monetary reward for good driving behavior, an indication of lower insurance rates in current or next term for insurance, and/or any other suitable kudo or incentive.

In an alternative embodiment, the portable electronic device itself can calculate the driving quotient for the current driver. Thus the portable electronic device generates or updates a driving quotient for the current driver and then displays the driving quotient to the driver. The electronic portable device may advise the driver when the revised driving quotient is more than 1 standard of deviation lower or higher than the assigned driving quotient of the driver.

Aspects of the disclosure have been described in terms of illustrative embodiments thereof. Numerous other embodiments, modifications and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the invention as set forth in the appended claims.

What is claimed is:

1. A driver apparatus configured to advise a driver of surrounding drivers, the apparatus comprising:
    a portable electronic device configured for displaying to a current driver a notification when the portable electronic device receives a signal;
    a processing unit comprising a processor for executing computer-executable instructions; and
    a memory unit storing computer-executable instructions, which when executed by the processing unit, cause the processing unit to perform a method for analyzing location of drivers and driver quotients, wherein a driving quotient is a relative score of driver behavior;
    wherein the portable electronic device receives a driving quotient for the current driver;
    wherein the portable electronic device identifies the location of the current driver and sends the location to the processor unit;
    wherein the processor unit detects nearby drivers within pre-determined radius of the current driver and identifies driver quotients for each of the nearby drivers;
    wherein the processor unit determines if the driving quotient of more than 50% of the nearby drivers is more than 1 standard of deviation lower than the driving quotient of the current driver;
    wherein the processor unit transmits a notification to the portable electronic device of the current driver regarding the nearby drivers more than 1 standard of deviation lower than the driving quotient of the current driver;
    wherein the processor unit provides recommendations to the portable electronic device of the current driver for managing the driving of the nearby drivers more than 1 standard of deviation lower than the driving quotient of the current driver;
    wherein the recommendations include providing an alternate route having a current flow of drivers without quotients more than 1 standard of deviation lower than the driving quotient of the current driver;
    wherein the portable electronic device detects if the current driver has followed the recommendations; and
    wherein if the current driver does not respond to a notification of recommended actions, the unit processor issues instructions to the current driver's vehicle.

2. The driver apparatus of claim 1 wherein the recommendations include at least one of maintaining a greater following distance from other drivers and discouraging lane changes.

3. The driver apparatus of claim 1 wherein a standard of deviation lower than the driving quotient of the current driver is determined from a distribution curve of driving patterns associated with the driving quotients.

4. The driver apparatus of claim 1 wherein the portable electronic device is a cell phone, a tablet, or a GPS unit.

5. The driver apparatus of claim 1 wherein the location of the vehicle is determined by via GPS coordinates.

6. The driver apparatus of claim 1 wherein the predetermined radius is selected from 0.2, 0.25, 0.3, 0.35 0.4, 0.45, or 0.5 mile radius from the current driver.

7. A driver apparatus configured to modify current driving behavior of a driver, wherein the driver has an assigned driver quotient, wherein the driving quotient is a relative score of driver behavior; comprising:
    a portable electronic device configured for displaying to a driver a notification when the portable electronic device receives a signal;
    a processing unit comprising a processor for executing computer-executable instructions; and
    a memory unit storing computer-executable instructions, which when executed by the processing unit, cause the processing unit to perform a method for calculating a driving quotient based on current driving behavior:
    wherein a plurality of real-time driving inputs is captured for a driver of a vehicle by the portable electronic device and transmitted to the processing unit;
    wherein the processor unit calculates a revised driving quotient based at least in part on the plurality of real-time driving inputs and the one or more driving conditions;
    wherein the processor unit determines if the driving quotient is more than 1 standard of deviation lower or higher than the assigned driving quotient of the driver;
    wherein the processor unit transfers the revised driving quotient to a validating agency for validating the revised driving quotient;
    wherein the processor unit transmits a notification to the portable electronic device of the driver if the driving quotient is more than 1 standard of deviation lower than the assigned driving quotient of the driver, wherein the notification is the revised driving quotient and the behavior that caused the revised driving quotient;
    wherein the processor unit provides recommendations for the driver for managing the driving of the driver by transmitting the recommendations to the portable electronic device based on the revised driving quotient, the behavior that caused the revised driving quotient, and consequences of not following the recommendations;
    wherein the processor unit detects if the current driver has followed the recommendations; and
    wherein if the driver does not respond to a notification of recommendations, the unit processor issues instructions to the driver's vehicle.

8. The driver apparatus of claim 7 wherein the behavior is at least one of braking and over speeding.

9. The driver apparatus of claim 7 wherein if the revised driving quotient is more than 2 standard of deviation lower than the assigned driving quotient of the driver, then the unit processor notifies the driver through the portable electronic device of the revised driving quotient and the behavior that caused the revised driving quotient.

10. The driver apparatus of claim 9 wherein the unit processor notifies the driver through the portable electronic device of recommendations depending on the behavior that caused the revised driving quotient.

11. The driver apparatus of claim 10, wherein if the driver does not respond to the notification of recommendations, the unit processor issues instructions to the driver's vehicle to bring the vehicle to a slow stop.

12. The driver apparatus of claim 7 wherein if the revised driving quotient is more than 1 standard of deviation higher than the assigned driving quotient of the driver, then the unit processor notifies the driver through the portable electronic device of the revised driving quotient and the behavior that caused the revised driving quotient.

13. The driver apparatus of claim 12 wherein the behavior is at least one of less than 2 braking events during a time period and driving within 2 miles per hour of a posted speed limit.

14. The driver apparatus of claim 12 wherein the unit processor provides the driver through the portable electronic device an icon indicating good driving behavior, a monetary reward for good driving behavior, or indication of lower insurance rates in current or next term for insurance.

15. A driver apparatus configured to modify current driving behavior of a driver, wherein the driver has an assigned driver quotient, wherein the driving quotient is a relative score of driver behavior; comprising:

a portable electronic device configured for displaying to a driver a notification when the portable electronic device;

wherein a plurality of real-time driving inputs is captured for a driver of a vehicle by the portable electronic device;

wherein the portable electronic device calculates a revised driving quotient based at least in part on the plurality of real-time driving inputs and the one or more driving conditions;

wherein the portable electronic device determines if the driving quotient is more than 1 standard of deviation lower or higher than the assigned driving quotient of the driver;

wherein the portable electronic device transfers the revised driving quotient to a validating agency for validating the revised driving quotient;

wherein the portable electronic device notifies the driver if the driving quotient is more than 1 standard of deviation lower than the assigned driving quotient of the driver, wherein the notification is the revised driving quotient and the behavior that caused the revised driving quotient;

wherein the portable electronic device provides recommendations for the driver for managing the driving of the driver based on the revised driving quotient, the behavior that caused the revised driving quotient, and consequences of not following the recommendations;

wherein the portable electronic device detects if the current driver has followed the recommendations;

wherein if the driver does not respond to a notification of recommendations, the portable electronic device issues instructions to the driver's vehicle.

16. The driver apparatus of claim 15 wherein the behavior is at least one of braking and over speeding.

* * * * *